US007206842B2

(12) United States Patent
Nainani et al.

(10) Patent No.: US 7,206,842 B2
(45) Date of Patent: Apr. 17, 2007

(54) METHOD AND APPARATUS TO FACILITATE ACCESS AND PROPAGATION OF MESSAGES IN COMMUNICATION QUEUES USING A PUBLIC NETWORK

(75) Inventors: Bhagat V. Nainani, Foster City, CA (US); Neerja Bhatt, Mountain View, CA (US); Shailendra K. Mishra, Fremont, CA (US); Krishnan Meiyyappan, Fremont, CA (US); Namit Jain, Foster City, CA (US); Wei Wang, Belmont, CA (US)

(73) Assignee: Oracle International Corp., Redwood Shores, CA (US)

( * ) Notice: Subject to any disclaimer, the term of this patent is extended or adjusted under 35 U.S.C. 154(b) by 56 days.

(21) Appl. No.: 11/213,191

(22) Filed: Aug. 25, 2005

(65) Prior Publication Data

US 2006/0015565 A1    Jan. 19, 2006

Related U.S. Application Data

(63) Continuation of application No. 10/027,100, filed on Dec. 19, 2001, now Pat. No. 6,978,305.

(51) Int. Cl.
*G06F 15/173* (2006.01)
(52) U.S. Cl. ...................................... 709/225; 709/206
(58) Field of Classification Search ................ 709/225, 709/206; 707/10
See application file for complete search history.

(56) References Cited

U.S. PATENT DOCUMENTS

| 5,887,168 | A   | 3/1999 | Bahls et al. ................ 719/314 |
| 6,226,642 | B1  | 5/2001 | Beranek et al. ............... 707/10 |
| 6,275,496 | B1  | 8/2001 | Burns et al. ................ 370/429 |
| 6,446,206 | B1  | 9/2002 | Feldbaum .................... 713/175 |
| 6,597,688 | B2  | 7/2003 | Narasimhan et al. ........ 370/353 |
| 6,674,767 | B1  | 1/2004 | Kadyk et al. ............... 370/466 |
| 6,738,822 | B2  | 5/2004 | Fukasawa et al. .......... 709/231 |
| 6,742,043 | B1  | 5/2004 | Moussa et al. ............. 709/232 |
| 6,910,154 | B1* | 6/2005 | Schoenthal .................. 714/18 |

* cited by examiner

*Primary Examiner*—Krisna Lim
(74) *Attorney, Agent, or Firm*—Park, Vaughan & Fleming, LLP (57) ABSTRACT

One embodiment of the present invention provides a system that facilitates accessing communication queues using a public network. The system operates by first generating a message or messages at a client. The system then formats these messages in a publicly available format. Next, the system communicates the messages across the public network to a web server. The web server receives the messages and transforms the messages to a database specific format. The web server then passes the messages to a queue within a database server across a proprietary network. In one embodiment of the present invention, the system includes queue-to-queue propagation with exactly once guarantees and recovery from failures. In one embodiment of the present invention, the system includes transactional guarantees when a client accesses a queue.

20 Claims, 10 Drawing Sheets

METHOD AND APPARATUS TO FACILITATE ACCESS AND PROPAGATION OF MESSAGES IN COMMUNICATION QUEUES USING A PUBLIC NETWORK

RELATED APPLICATION

This application is a continuation of U.S. patent application Ser. No. 10/027,100, filed 19 Dec. 2001 now U.S. Pat. No. 6,978,305. This application hereby claims priority under 35 U.S.C. §120 to the above-listed application.

BACKGROUND

1. Field of the Invention

The present invention relates to communications between computer applications. More specifically, the present invention relates to a method and an apparatus to facilitate accessing communication queues using a public network.

2. Related Art

Computer applications executing on a computing system often need to communicate with other computer applications executing on other computing systems. One method of communicating between these computer applications is to establish a direct link between the computer systems. Establishing direct links from one application to another, however, is impractical because of the amount of resources required and because these computer applications may not be executing at the same time.

Another method of communicating between computer applications is to use message queues. When using message queues, a client—a computer application executing on a computing system—can send a message to a queue or to a list of intended recipients, receive a message from a queue, and can register to be notified of messages in the queue.

Figure 1:
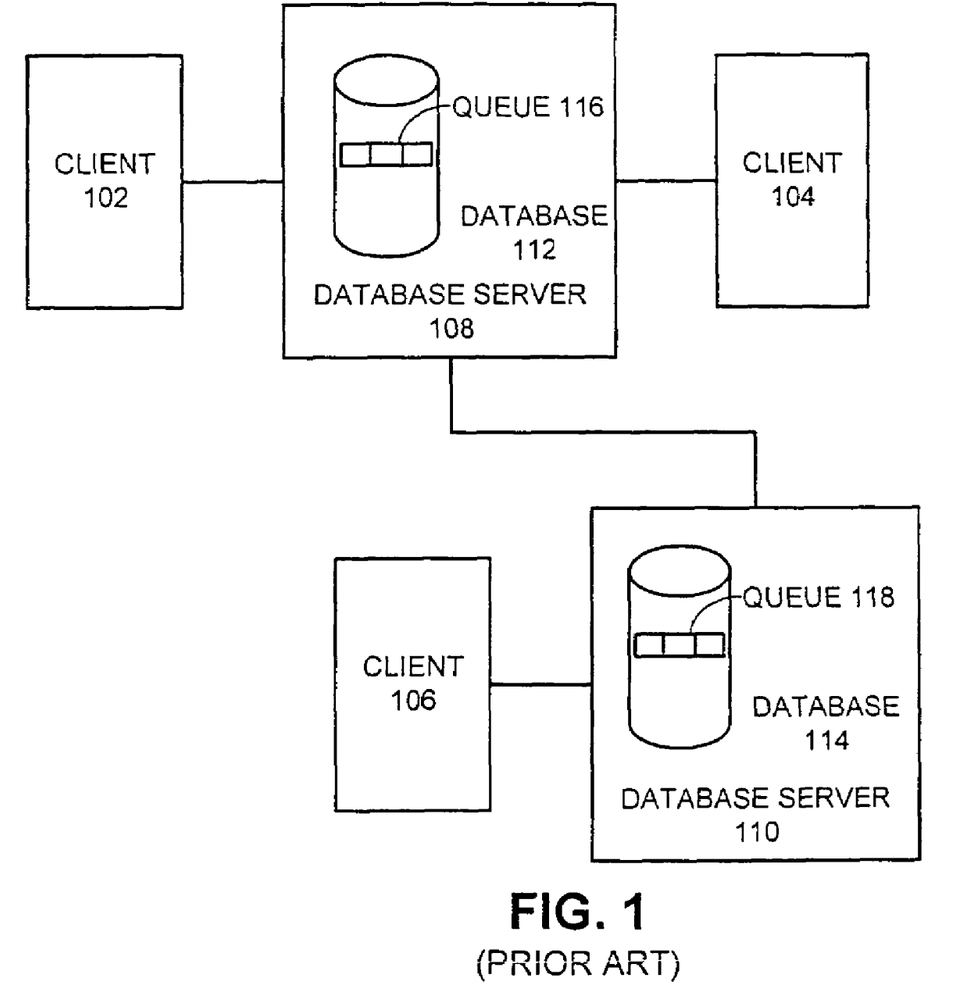
FIG. 1 illustrates a number of computer systems coupled together.

FIG. 1 illustrates a number of computer systems coupled together, including clients 102, 104, 106, and database servers 108 and 110. Clients 102, 104, 106, and database servers 108 and 110 can generally include any type of computer system, including, but not limited to, a computer system based on a microprocessor, a mainframe computer, a digital signal processor, a portable computing device, a personal organizer, a device controller, and a computational engine within an appliance.

Database servers 108 and 110 include databases 112 and 114, respectively, and databases 112 and 114 include queues 116 and 118, respectively. Databases 112 and 114 can include any type of system for storing data in non-volatile storage. This includes, but is not limited to, systems based upon magnetic, optical, and magneto-optical storage devices, as well as storage devices based on flash memory and/or battery-backed up memory.

Clients 102 and 104 are coupled to database server 108 across communication links or networks using a database specific language such as procedural language/structured query language (PL/SQL) or Oracle® Call Interface (OCI) from Oracle® Corporation. Oracle® is a trademark or registered trademark of Oracle® Corporation in the United States of America and other countries. Client 106 is coupled to database server 110 across a communication link using the same database specific language. Additionally, database server 108 is coupled to database server 110 across a communication link also using the same database specific language.

During operation, a client, say client 102, wishing to communicate with another client, say client 104, generates a message and sends it to a database server, in this case, database server 108. Upon receiving this message, database server 108 puts the message in queue 116 within database 112. Database server 108 then notifies client 104, assuming that client 104 has registered with queue 116, that the message is available. Client 104 then retrieves the message from queue 116 by sending a receive, or dequeue, message to database server 108. Client 102 can also send a list of recipients for the message to database server 108. In this case, all of the recipients are notified that the message is available and they can all retrieve the message.

In another scenario, client 102 may wish to communicate with client 106. Client 102 generates the message, addresses the message to client 106, and sends it to database server 108. Database server 108 puts the message in queue 116 as before. This time, however, since the recipient is on a remote database, database server 108 propagates the message from queue 116 to database server 110. Database server 110 places the message in queue 1 18 within database 114. Assuming that client 106 has registered with queue 118, database server 110 notifies client 106 that the message is available. Client 106 then retrieves the message.

While message queues provide an efficient method to communicate asynchronously between executing applications on different clients, this method has a major disadvantage. Database servers 108 and 110 use a database specific language such as PL/SQL and messages using the database specific format are not compatible with message formats of databases that use different database specific languages. Additionally, these messages are not compatible with message formats used on the Internet. Also, there is no established mechanism to pass these messages through firewalls that are placed between a corporate intranet and the Internet.

What is needed is a method and an apparatus, which allows clients and databases to propagate messages from one queue to another queue with "exactly once" and "transactional" guarantees and to access the messages within these queues, both propagating and accessing these messages over a public network such as the Internet.

SUMMARY

One embodiment of the present invention provides a system that facilitates accessing communication queues using a public network. The system operates by first generating a message or messages at a client. The system then formats these messages in a publicly available format. Next, the system communicates the messages across the public network to a web server. The web server receives the messages and transforms the messages to a database specific format. The web server then passes the messages to a queue within a database server across a proprietary network.

In one embodiment of the present invention, the publicly available format includes extensible markup language (XML).

In one embodiment of the present invention, communicating the messages across the public network includes communicating with hypertext transfer protocol (HTTP), simple mail transfer protocol (SMTP), or file transfer protocol (FTP). Using these protocols allows the messages to be communicated across a firewall.

In one embodiment of the present invention, the system sends the messages from the queue to a recipient.

In one embodiment of the present invention, the system publishes the messages from the queue to a list of recipients.

In one embodiment of the present invention, a client requests to receive the stored messages from the queue.

In one embodiment of the present invention, a client registers to receive messages from the queue.

In one embodiment of the present invention, the destination is a second queue in a second database. Alternatively, the recipient of the message is an application at a queue in a second database, thus enabling distributed applications that access different queues in different databases over the Internet.

In one embodiment of the present invention, the public network is the Internet.

In one embodiment of the present invention, the system authenticates the client to the web server and the web server proxies on behalf of the client when performing operations on the database.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 2:
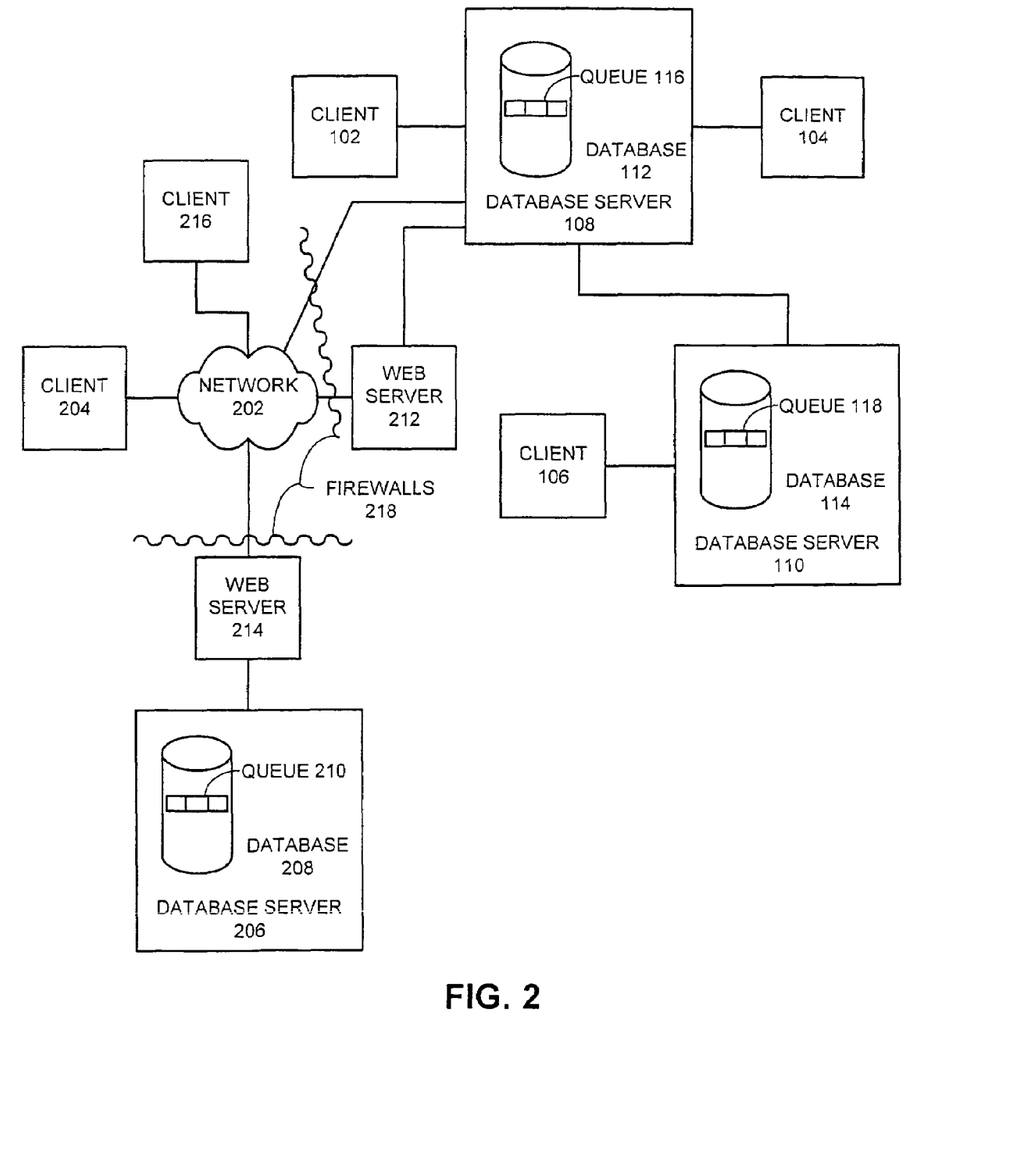
FIG. 2 illustrates computer systems coupled together in accordance with an embodiment of the present invention.

FIG. 2 illustrates computer systems coupled together in accordance with an embodiment of the present invention. The computer systems include clients 102, 104, 106, and database servers 108 and 110 as described above in conjunction with FIG. 1. Also included in the computer systems are client 204, web server 212, and database server 206. Client 204, web server 212, and database server 206 can generally include any type of computer system, including, but not limited to, a computer system based on a microprocessor, a mainframe computer, a digital signal processor, a portable computing device, a personal organizer, a device controller, and a computational engine within an appliance.

Client 204 and database server 206 are coupled to web server 212 across network 202. Network 202 can generally include any type of wire or wireless communication channel capable of coupling together computing nodes. This includes, but is not limited to, a local area network, a wide area network, or a combination of networks. In one embodiment of the present invention, network 202 includes the Internet.

Database server 206 includes database 208, which, in turn, includes queue 210. Database server 206 may use a database specific language that is different from the database specific language that database servers 108 and 110 use for accessing databases 112 and 114 respectively. Firewalls 218 prevent unauthorized access to database servers 108 and 206. Firewalls are well known in the art and will not be described further herein.

In operation, an application on client 204 generates a message for an application operating on another client, say client 104. This message is formatted into a format that is acceptable for passing messages to web server 212 across network 202. Extensible markup language (XML) is one format that is acceptable for passing messages to web server 212. The formatted message then is sent to web server 212 using hypertext transfer protocol (HTTP), simple mail transfer protocol (SMTP), or file transfer protocol (FTP). These protocols allow communication with web server 212 across network 202 even if a firewall is in place to prevent unauthorized access to web server 212. In addition, web server 212 can authenticate client 204 by using user name/password protocols or by using secure socket layer (SSL) certificates.

Upon receiving a message from client 204, web server 212 removes the formatting applied by client 204 and reformats the message in the database specific language acceptable by database server 108. Web server 212 then passes this message to database server 108. Database server 108 processes the message from web server 212 in the same manner as a message from client 102 as described above in conjunction with FIG. 1.

The web server maps the Internet client to a valid database user and then proxies on behalf of the client. The web server also starts a transaction when it receives the first operation. All operations are grouped and changes are committed when the user issues a commit. If the user does not issue a commit, changes are automatically rolled back. This ensures that partial results are never seen. When a transaction starts, a transaction ID is passed back to the client and all subsequent requests join the same transaction as long as they carry this transaction ID.

Messages from database server 108 to client 204 are presented to web server 212 by database server 108. These messages are translated to XML format for transfer across network 202 to client 204. Client 204 then recovers the message from XML format.

Communications with database server 206 are processed in much the same manner as communications with client 204. Say client 102 wishes to send a message to client 204 using a different database 208. A message being passed from database server 108 to database server 206, destined for queue 210, is translated into XML format by database server 108 for transport across network 202 to web server 214. Database server 206 then reformats the message into the database specific format used by database server 206. Messages are sent to the database server exactly once, with the system handling recovery from failures and remote system unavailability. Messages going the opposite direction are formatted by database server 206 into XML format and sent across network 202 to web server 212. Web server 212 then transforms the message into the database specific language used by database server 108.

Communications Between Client and Web Server

Figure 3:
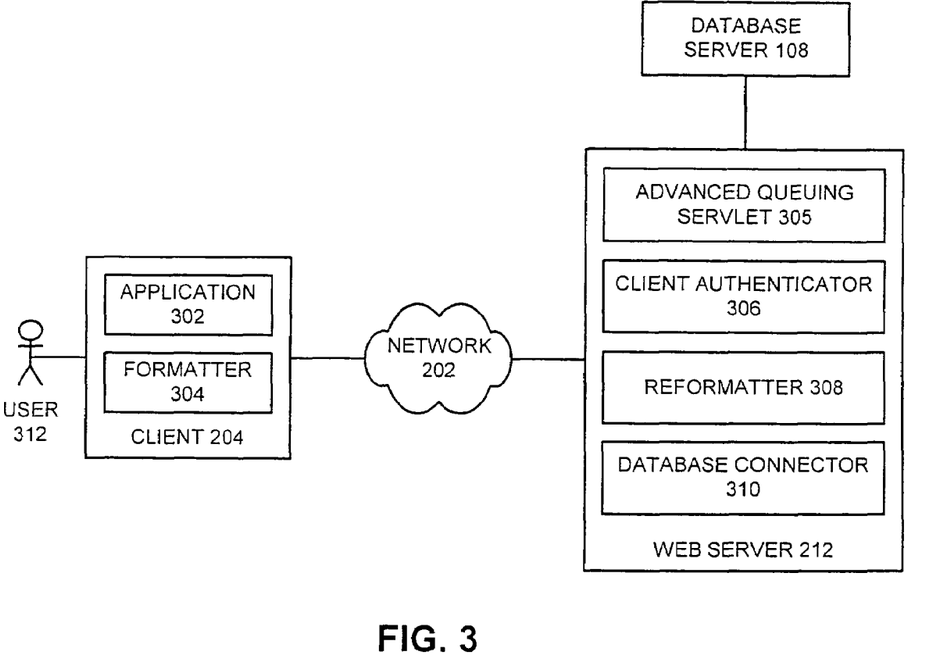
FIG. 3 illustrates client 204 communicating with web server 212 in accordance with an embodiment of the present invention.

FIG. 3 illustrates client 204 communicating with web server 212 in accordance with an embodiment of the present invention. User 312 causes application 302 within client 204 to generate a message that needs to be passed across network 202 to web server 212 and, ultimately, to a database server such as database server 108, which is coupled to web server 212. Application 302 uses formatter 304 to format the message in a format such as XML, which is compatible with network 202.

User 312 then communicates with client authenticator 306 in web server 212 to authenticate application 302 and user 312 to web server 212. This authentication can use any available authentication technique. Typically, the authentication techniques include user name/password and SSL certificates. Client 204 then sends the formatted message to web server 212 across network 202 using HTTP, SMTP, or FTP.

After client authenticator 306 authenticates application 302 and user 312, web server 212 passes the message to advanced queuing servlet 305. Advanced queuing servlet 305 causes reformatter 308 to translate the message from XML to the specific database language required by database server 108. After reformatter 308 has translated the message, web server 212 uses database connector 310 to establish a link with database server 108 if a link has not been previously established between web server 212 and database server 108. Note that web server 212 may act as a proxy for client 204 and that web server 212 may be authenticated to database server 108 as a different client. Web server 212 then passes the message to database server 108 and the appropriate operation is performed on the destination queue in the database.

Client Access to a Queue

FIG. 4 is a flowchart illustrating the process of a client communicating with a queue in accordance with an embodiment of the present invention. The system starts when user 312 causes application 302 to generate a message (step 401). Next, formatter 304 formats this message into XML format (step 402). After formatter 304 has formatted the message, user 312 authenticates with web server 212 (step 403). Client 204 then delivers the message to an advanced queuing servlet within web server 212 across network 202 (step 404).

Upon receiving the message at web server 212, database connector 310 examines the agent/database user mapping table to select a database user that can be used to perform the client operation (step 406). Database connector 310 then proxies on behalf of the client and authenticates with database server 108 (step 407).

Next, the system determines if there is a transaction ID specified in the request (step 408). If not, the system generates a globally unique transaction ID (step 419). The system then starts a new transaction (step 421).

If there is a transaction ID specified in the request at step 408, the system determines the operation type (step 409). These operation types include commit, rollback, and others (receive, send, publish, etc.) If the transaction type is commit, the system determines if the previous request in the transaction was a push request (step 411). If so, the system logs the sequence number and marks the status as 'received' (step 412). After marking the status as received or if the previous request in the transaction was not a push request at step 411, the system commits the transaction (step 413).

If the operation type at step 409 is rollback, the system aborts the transaction and rolls back all changes (step 417). After committing the transaction at step 413 or after rolling back the changes at step 417, the system generates a response with status code set and also resets transaction ID (to 0) (step 414). If the operation type is not commit or rollback, the process "joins" the transaction specified in the request (step 418).

Figure 4A:
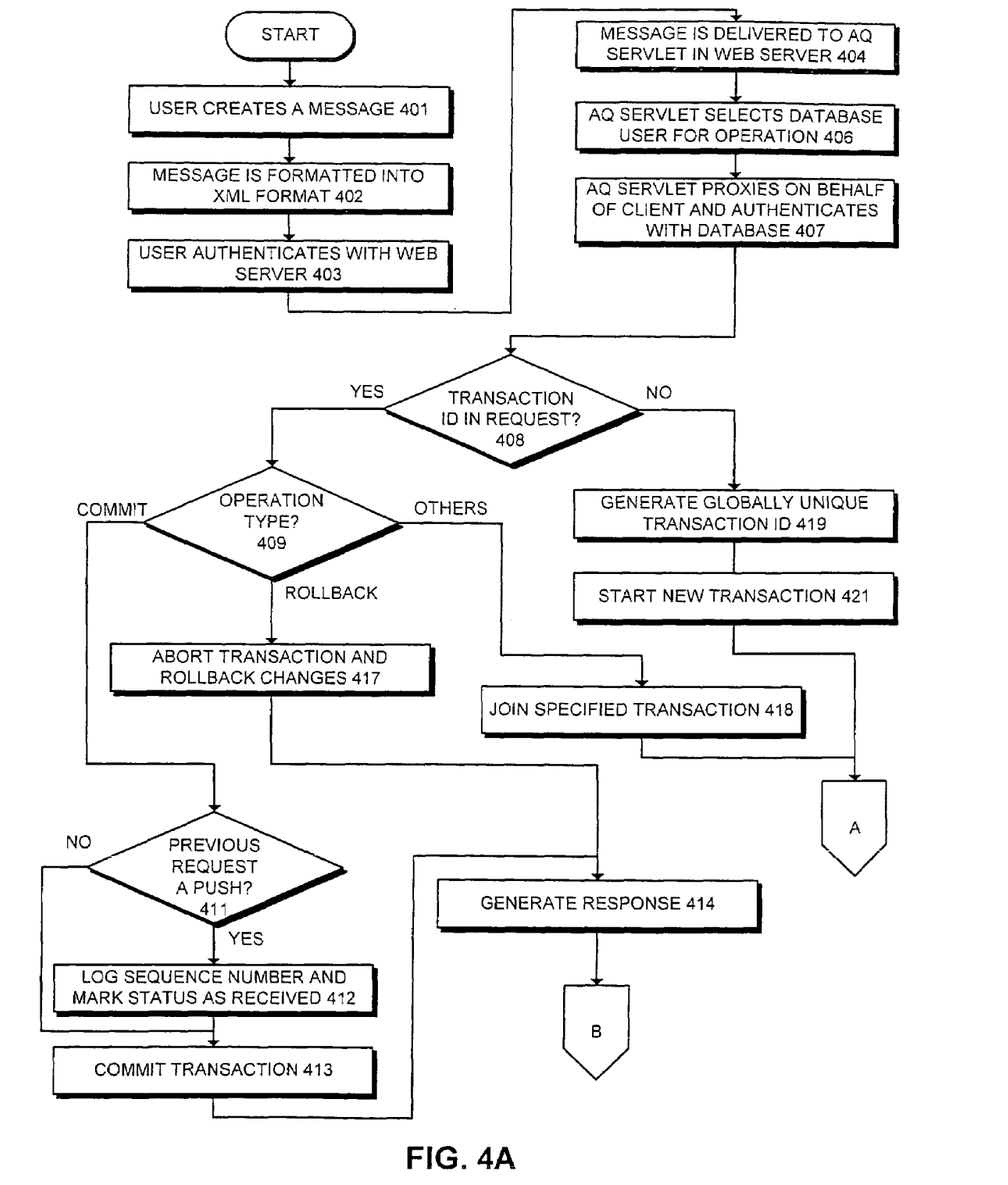
FIG. 4 is a flowchart illustrating the process of a client communicating with a queue in accordance with an embodiment of the present invention.
Figure 4B:
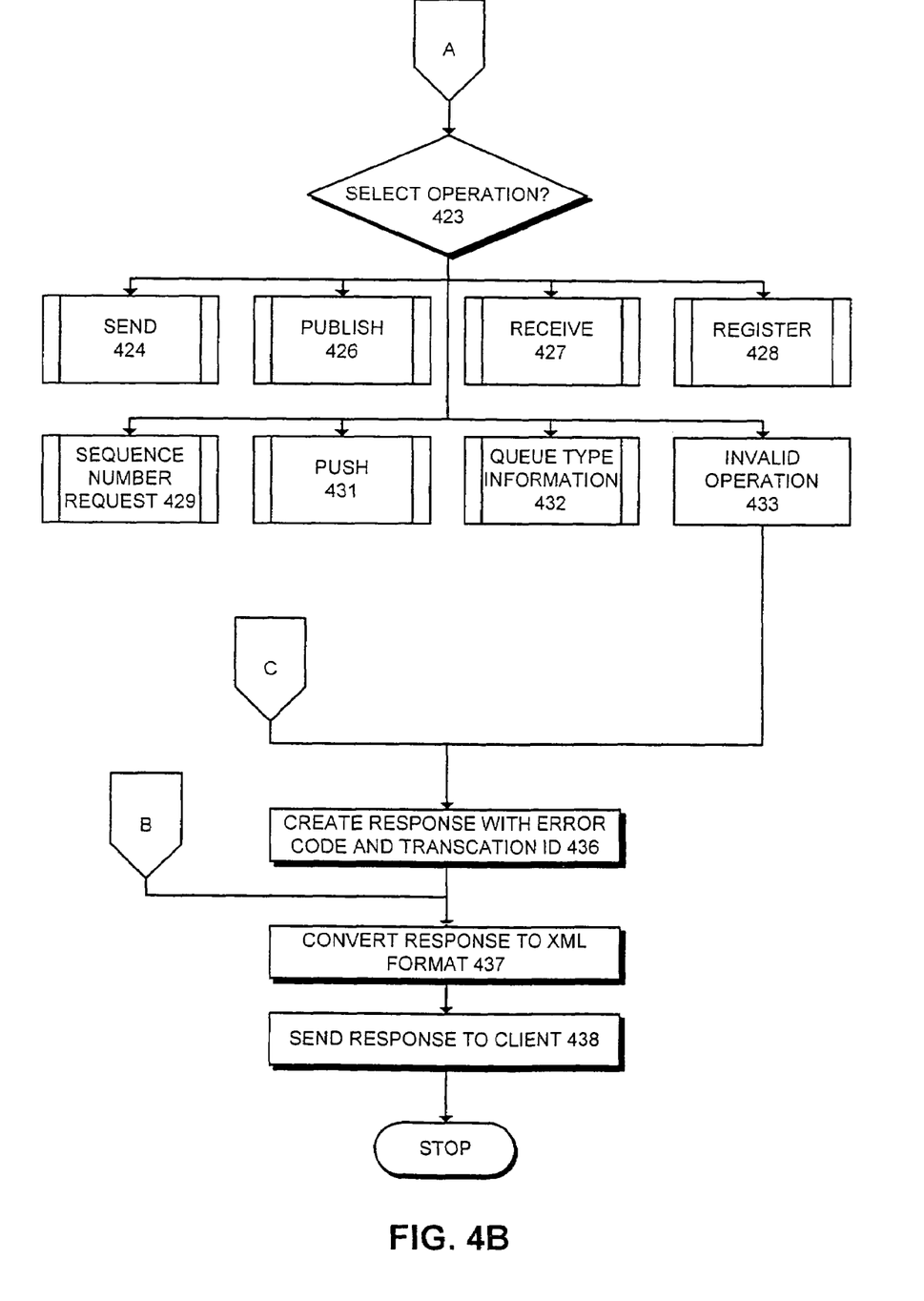

After starting a new transaction at step 421 or after joining a previous transaction at step 409, the process continues at off page connector A in FIG. 4B where the system selects an operation (step 423). The possible operations include send 424, publish 426, receive 427, register 428, sequence number request 429, push 431, queue type information 432, and invalid operation 433. If the operation is not one of these expected operations, the system creates a response with an error code and, if available, a transaction ID (step 436). Note that this step is also the entry point from off page connector C. At any point within the process where an error is detected, control is routed to off page connector C.

After creating a response at step 436, the system converts the response to XML format (step 437). Note that this step is also the entry point for off page connector B. At any point in the process where a response is generated, control is routed to off page connector B. After converting the response to XML format, the system sends the response to the client ending the process (step 438).

Figure 4C:
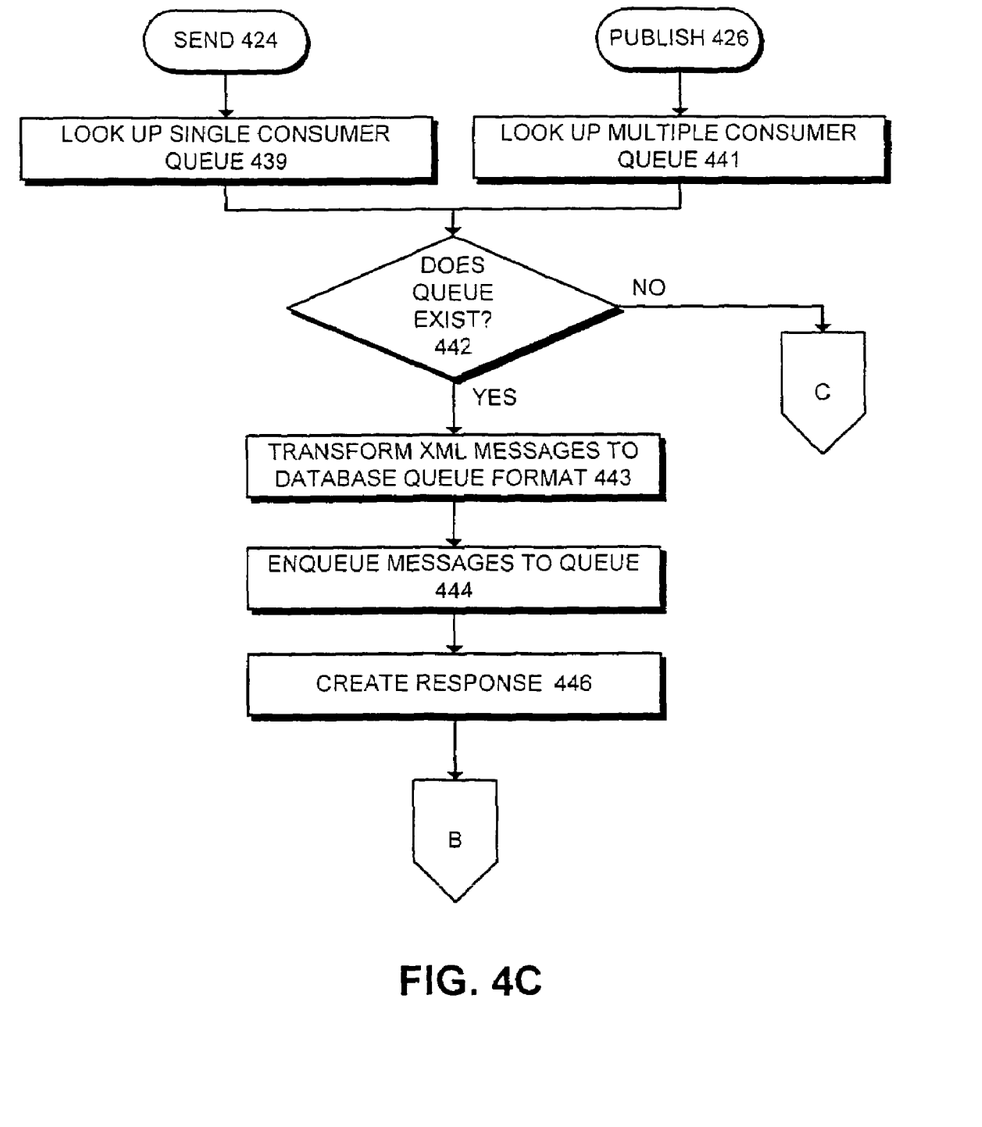

Referring to FIG. 4C, if the operation is send 424, the system looks up the single consumer queue (step 439). If the operation is publish 426, the system looks up the multiple consumer queue (step 441). After looking up the queue at step 4390 or step 441, the system determines if the queue exists (step 442). If not, the process continues at off page connector C to create an error response as described above.

If the queue exists at step 442, the system transforms the XML messages to the database queue format (step 443). Next, the system enqueues the messages to the queue (step 444). After enqueueing the messages, the system creates a response with the enqueued message Ids and the transaction ID (step 446). The process then continues at off page connector B on FIG. 4B as described above.

Figure 4D:
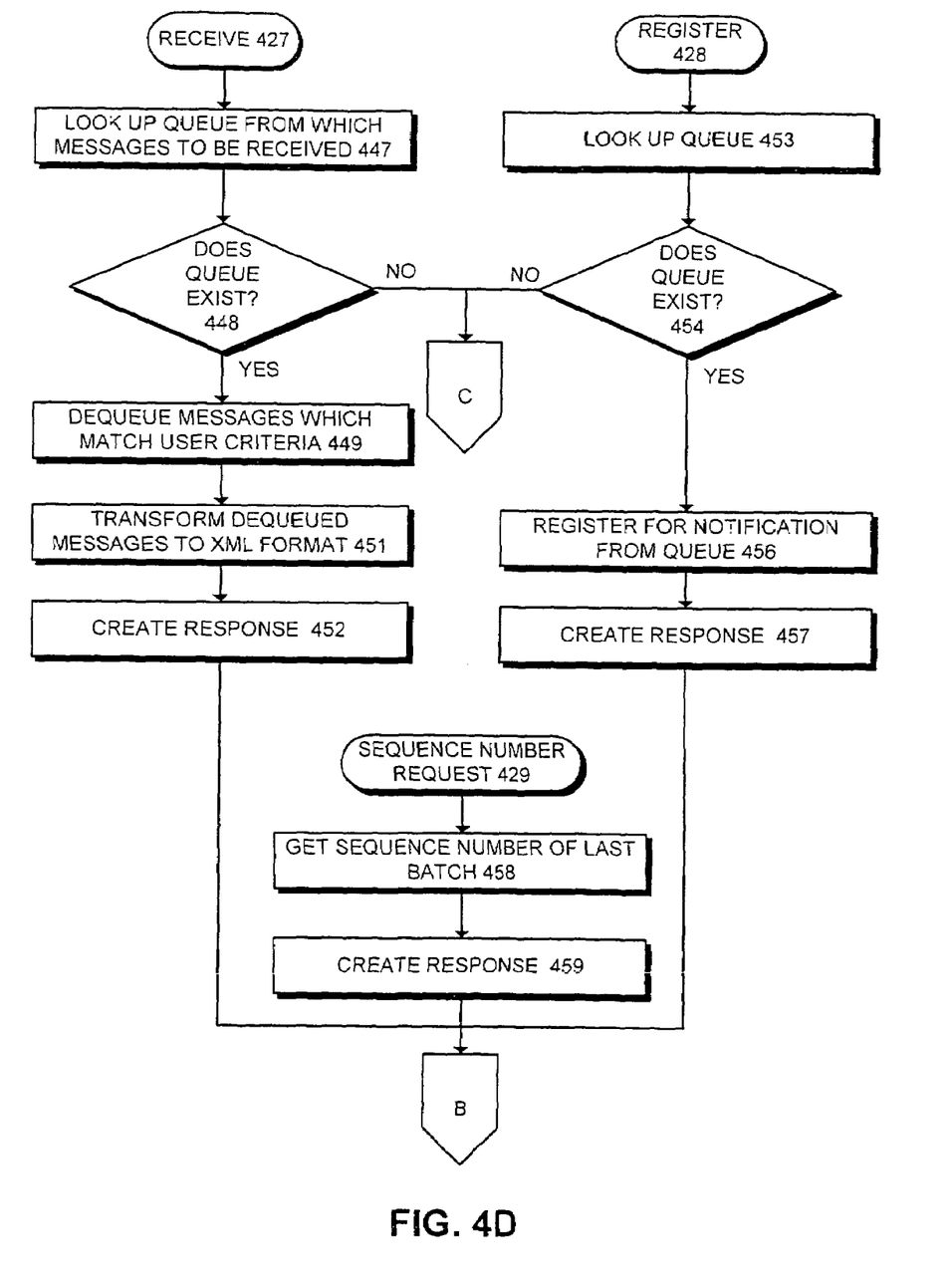

Referring now to FIG. 4D, if the operation is receive 427, the system looks up the queue from which messages are to be received (step 447). Next, the system determines if the queue exists (step 448). If not, the process continues at off page connector C on FIG. 4B to create an error response as described above.

If the queue exists at step 448, the system dequeues messages, which match the user's criteria (step 449). Next, the system transforms the dequeued messages to XML format (step 451). The system then creates a response with status code, dequeued messages, and transaction ID (step 452). The process continues at off page connector B on FIG. 4B to send the response to the client as described above.

If the operation is register 428, the system looks up the queue (step 453). Next, the system determines if the queue exists (step 454). If not, the process continues at off page connector C on FIG. 4B to create an error response as described above.

If the queue exists at step 454, the system registers for notification from the queue at a specified URL (step 456). Next, the system creates a response with status code and transaction ID (step 457). The process then continues at off page connector B on FIG. 4B to send the response to the client as described above.

If the operation is sequence number request 429, the system gets the sequence number of the last batch received form the source queue database (step 458). Next, the system creates a response with status code, sequence number, and transaction ID (step 459). The process then continues at off page connector B on FIG. 4B to send the response to the client as described above.

Figure 4E:
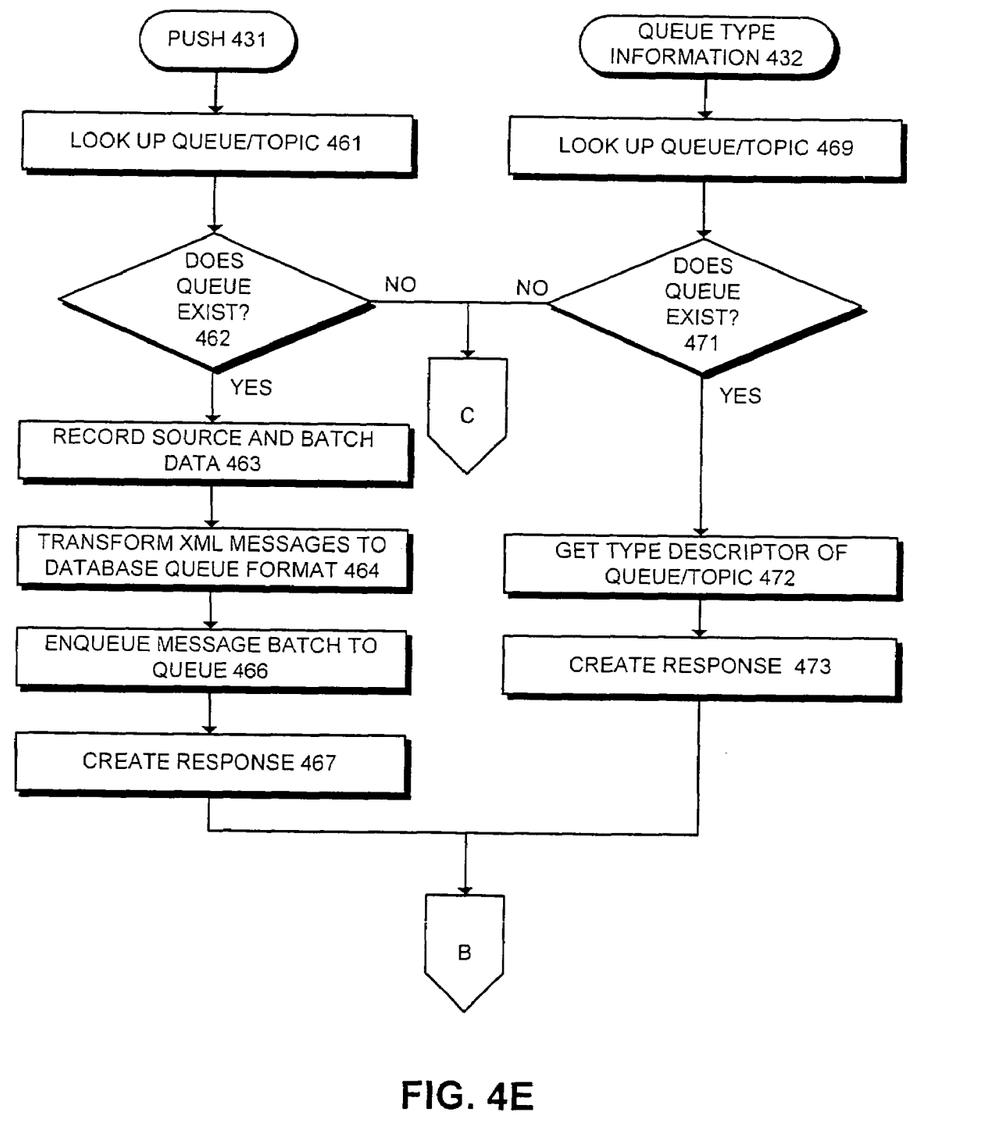

Referring now to FIG. 4E, if the operation is push 431, the system looks up the queue (step 461). Next, the system determines if the queue exists (step 462). If not, the process continues at off page connector C on FIG. 4B to create an error response as described above.

If the queue exists at step 462, the system records the batch number, source database, and the source queue name (step 463). Next, the system transforms the XML messages to the database queue format (step 464). The system then enqueues the message batch to the queue (step 466). After enqueueing the message batch, the system creates a response with status code, enqueued message Ids, and transaction ID (step 466). The process then continues at off page connector B on FIG. 4B to send the response to the client as described above.

If the operation is a queue type information 432, the system looks up the queue (step 469). Next, the system determines if the queue exists (step 471). If not, the process continues at off page connector C on FIG. 4B to create an error response as described above.

If the queue exists at step 471, the system gets the type descriptor of the queue (step 472). Next, the system creates a response with the status code, transaction ID, and the queue descriptor (step 473. The process then continues at off page connector B on FIG. 4B to send the response to the client as described above.

Queue to Queue Propagation

Figure 5A:
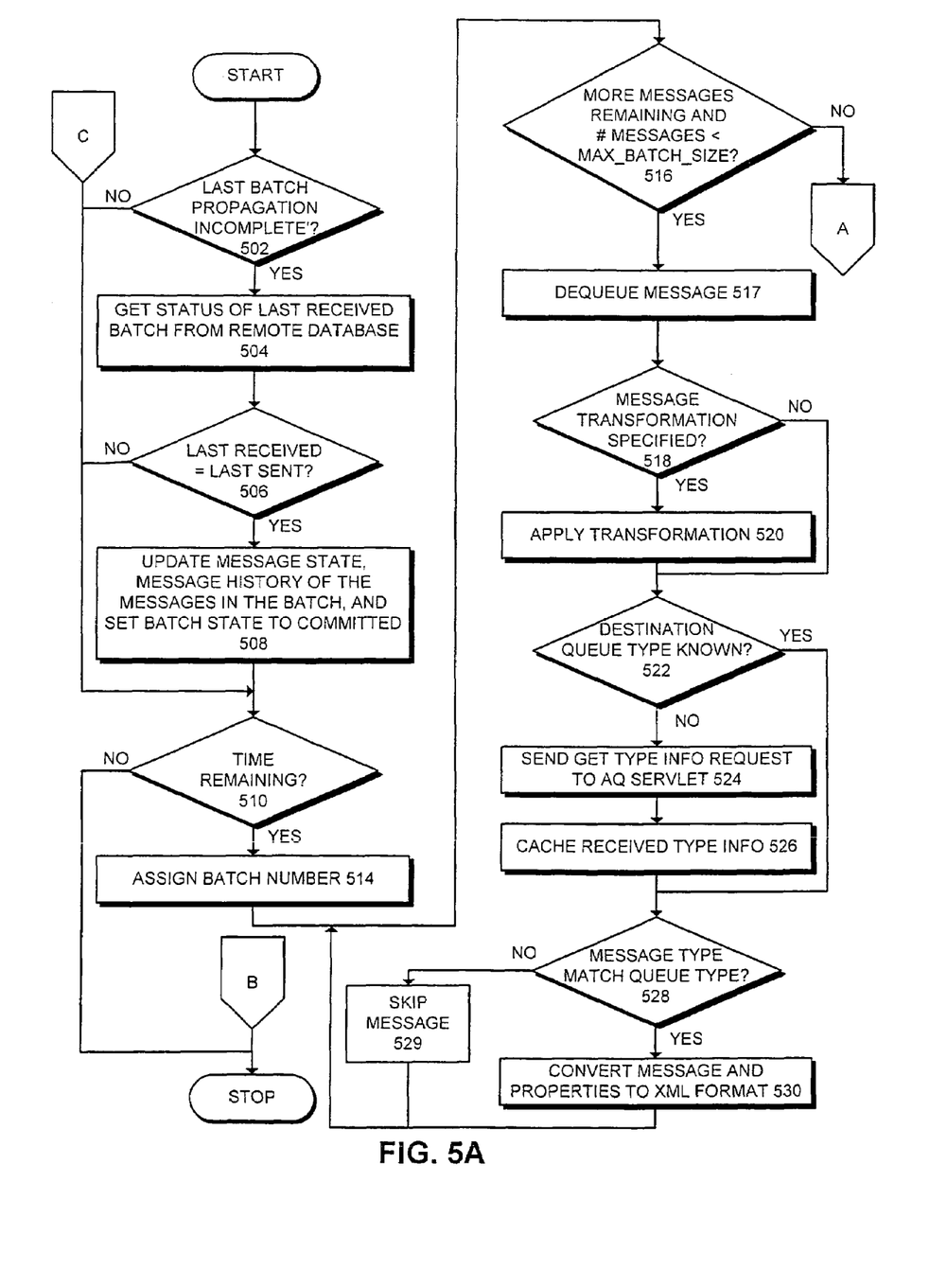
FIG. 5 is a flowchart illustrating the process of a queue within a database propagating messages to a queue in another database in accordance with an embodiment of the present invention.

FIG. 5 is a flowchart illustrating the process of a queue within a database propagating messages to a queue in another database in accordance with an embodiment of the present invention. Messages are propagated in batches and each batch has a monotonically increasing batch number. When propagating messages from queue-to-queue, the system starts by determining if any recovery is needed. The system does this by determining if the last batch of messages sent was in the 'prepared' state, (i.e., propagation of the batch was incomplete) (step 502). If so, the system checks if the batch was received by the destination (step 504). To check if the batch was received by the remote system, the system determines if the remote-last-received-batch-number is equal to the local-last-sent-batch-number (step 506). If so, the system updates the state and history information of the messages in the last batch (step 508). Otherwise, there is no recovery to be done.

After setting the state to committed in step 508, or if recovery is not needed at step 506, or if the propagation of the last batch was not complete at step 502, the system determines if there are more messages to propagate in the time allocated (step 510). Note that step 510 is also an entry point for off page connector C to form a loop to ensure that all messages are processed. If there are no more messages to process at step 510, the process terminates. Off page connector B is an entry point for terminating the process as described below.

If there is time remaining at step 510, the system will assign a batch number to the batch (step 514). Next, the system determines if there are more messages remaining in the batch (step 516). If so, the system dequeues the next message (step 517) and determines if there is a message transformation specified (step 518). If so, the system applies the transformation (step 520).

After applying the transformation at step 520, or if there is no transformation specified at step 518, the system determines if the destination queue type is known (step 522). If not, the system sends a get type info request to the advanced queuing servlet (step 524). Next, the system caches the received type information (step 526).

After caching the type information in step 526 or if the destination queue type is known at step 522, the system determines if the message type and the queue type match (step 528). If not, the message is skipped (step 529) and control returns to step 516 to check for additional messages in the batch. If the message type and the queue type match at step 528, the system converts the message and the message properties to XML format (step 530). The process then returns to step 516 to check for additional messages in the batch.

Figure 5B:
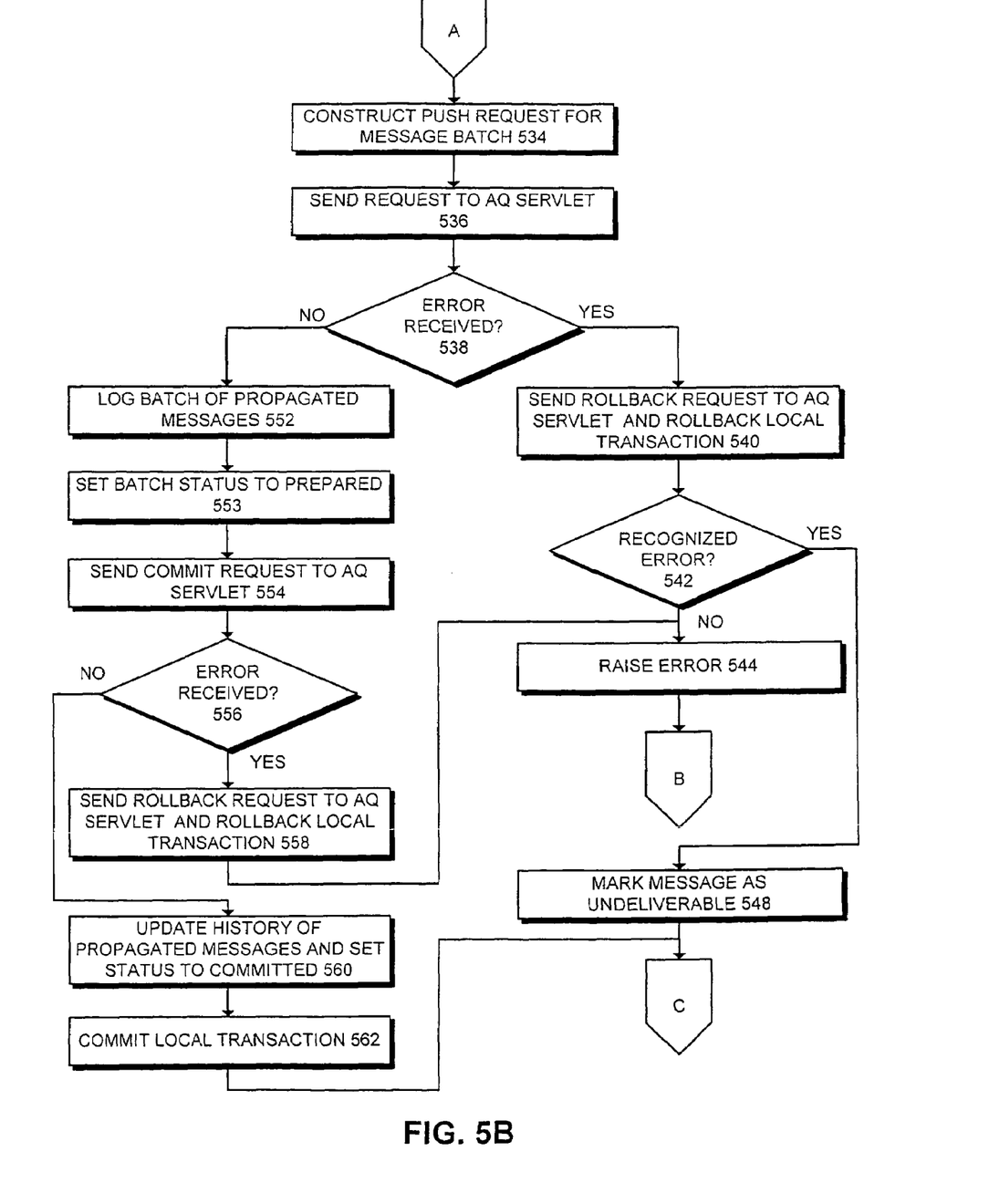

If there are no more messages at step 516, the process continues at off page connector A on FIG. 5B. The system constructs a push request for the message batch (step 534). Next, the system sends the request to the advanced queuing servlet (step 536). The system then determines if an error was received (step 538).

If no error was received at step 536, the system logs the batch of propagated messages (step 552). Next, the system sets the batch status to prepared (step 553). The system then sends a commit request to the advanced queuing servlet (step 554). Note that steps 552 and 553 may be done in an independent autonomous transaction. Next, the system determines if an error was received (step 556).

If no error was received at step 556, the system updates the history of the propagated messages and sets the status of the batch to committed (step 560). Next, the system commits the local transaction (step 562).

If an error is received at step 538, the system sends a rollback request to the advanced queuing servlet and aborts the local transaction (step 540). The system then determines if the error is a recognized error (step 542). If so, the system marks the message as undeliverable (step 548).

If the message is marked as undeliverable at step 548 or if the local transaction has been committed at step 562, the process continues at off page connector C as described above.

If the error is not a recognized error at step 542, or after rolling back the local transaction at step 558, the system raises an error (step 544). The process then continues at off page connector B and the process terminates.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate accessing communication queues using a public network, comprising:
   generating a message at a client;
   formatting the message at the client in a publicly available format;

communicating the message across the public network to a web server;

receiving the message at the web server;

transforming the message into a database specific format, wherein the database specific format is understood by a database server coupled to the web server;

passing the message to a queue within the database server across a proprietary network; and propagating the message from the queue within the database server to a recipient, and in doing so, guaranteeing exactly once delivery of the message to the recipient.

2. The method of claim 1, wherein the publicly available format includes extensible markup language (XML).

3. The method of claim 1, wherein communicating the message across the public network includes communicating with one of, hypertext transfer protocol (HTTP), simple mail transfer protocol (SMTP), and file transfer protocol (FTP), whereby the message can be communicated across a firewall.

4. The method of claim 1, further comprising receiving a request from the recipient to receive a stored message from the queue.

5. The method of claim 1, further comprising receiving a request from the recipient to receive notification of new messages from the queue.

6. The method of claim 1, wherein the recipient is a second queue in a second database.

7. The method of claim 1, wherein exactly once delivery is guaranteed by using a two-phase commit protocol.

8. The method of claim 1, wherein exactly once delivery is guaranteed by using a sequence number and not by a two phase commit.

9. A computer-readable storage medium storing instructions that when executed by a computer cause the computer to perform a method to facilitate accessing communication queues using a public network, comprising:

generating a message at a client;

formatting the message at the client in a publicly available format;

communicating the message across the public network to a web server;

receiving the message at the web server;

transforming the message into a database specific format, wherein the database specific format is understood by a database server coupled to the web server;

passing the message to a queue within the database server across a proprietary network; and propagating the message from the queue within the database server to a recipient, and in doing so, guaranteeing exactly once delivery of the message to the recipient.

10. The computer-readable storage medium of claim 9, wherein the publicly available format includes extensible markup language (XML).

11. The computer-readable storage medium of claim 9, wherein communicating the message across the public network includes communicating with one of, hypertext transfer protocol (HTTP), simple mail transfer protocol (SMTP), and file transfer protocol (FTP), whereby the message can be communicated across a firewall.

12. The computer-readable storage medium of claim 9, the method further comprising receiving a request from the recipient to receive a stored message from the queue.

13. The computer-readable storage medium of claim 9, the method further comprising receiving a request from the recipient to receive notification of new messages from the queue.

14. The computer-readable storage medium of claim 9, wherein the recipient is a second queue in a second database.

15. The computer-readable storage medium of claim 9, wherein exactly once delivery is guaranteed by using a two-phase commit protocol.

16. The computer-readable storage medium of claim 9, wherein exactly once delivery is guaranteed by using a sequence number and not by a two phase commit.

17. An apparatus to facilitate accessing communication queues using a public network, comprising:

a generating mechanism that is configured to generate a message at a client;

a formatting mechanism at the client that is configured to format the message in a publicly available format;

a communicating mechanism that is configured to communicate the message across the public network to a web server;

a receiving mechanism that is configured to receive the message at the web server;

a transforming mechanism that is configured to transform the message into a database specific format, wherein the database specific format is understood by a database server coupled to the web server;

a passing mechanism that is configured to pass the message to a queue within the database server across a proprietary network; and a propagating mechanism that is configured to propagate the message from the queue within the database server to a recipient, and in doing so, guarantees exactly once delivery of the message to the recipient.

18. The apparatus of claim 17, wherein the publicly available format includes extensible markup language (XML).

19. The apparatus of claim 17, wherein communicating the message across the public network includes communicating with one of, hypertext transfer protocol (HTTP), simple mail transfer protocol (SMTP), and file transfer protocol (FTP), whereby the message can be communicated across a firewall.

20. The apparatus of claim 17, wherein the communication mechanism is configured to receive a request from the recipient to receive a stored message from the queue.

* * * * *